United States Patent
Cho

(10) Patent No.: US 6,606,423 B2
(45) Date of Patent: *Aug. 12, 2003

(54) IMAGE FORMAT CONVERTING METHOD AND APPARATUS

(75) Inventor: Yong-hun Cho, Seoul (KR)

(73) Assignee: Samsung Electronics Co., Ltd., Kyungki-do (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 171 days.

(21) Appl. No.: 08/961,944

(22) Filed: Oct. 31, 1997

(65) Prior Publication Data

US 2002/0094136 A1 Jul. 18, 2002

(30) Foreign Application Priority Data

Jun. 26, 1997 (KR) .............................. 97-27615

(51) Int. Cl.$^7$ .................................. G06K 9/32
(52) U.S. Cl. ................ 382/300; 348/441; 348/667; 382/261; 382/263; 382/264
(58) Field of Search ................ 382/260, 263, 382/264, 299, 300; 348/561, 581, 704

(56) References Cited

U.S. PATENT DOCUMENTS

| | | | | |
|---|---|---|---|---|
| 4,833,625 A | * | 5/1989 | Fisher et al. ................ 345/439 |
| 5,054,100 A | * | 10/1991 | Tai ............................... 382/300 |
| 5,307,167 A | | 4/1994 | Park et al. | |
| 5,550,935 A | * | 8/1996 | Erdem et al. ................ 382/260 |
| 5,608,824 A | * | 3/1997 | Shimizu et al. ............. 382/276 |
| 5,703,965 A | * | 12/1997 | Fu et al. ..................... 382/232 |
| 5,757,973 A | * | 5/1998 | Wilkinson et al. .......... 382/246 |
| 5,798,795 A | * | 8/1998 | Glenn et al. ........... 375/240.11 |
| 5,822,456 A | * | 10/1998 | Reed et al. ................. 382/232 |
| 5,832,123 A | * | 11/1998 | Oyamada ..................... 382/237 |
| 5,867,606 A | * | 2/1999 | Tretter ........................ 382/261 |
| 5,880,767 A | * | 3/1999 | Liu ............................. 347/251 |
| 5,917,963 A | * | 6/1999 | Miyake ....................... 382/300 |
| 6,018,596 A | * | 1/2000 | Wilkinson .................. 382/260 |
| 6,034,786 A | * | 3/2000 | Kwon ......................... 358/1.2 |

FOREIGN PATENT DOCUMENTS

WO wo 9602894 A1 2/1996

* cited by examiner

Primary Examiner—Bhavesh M. Mehta
Assistant Examiner—Gregory Desire
(74) Attorney, Agent, or Firm—Sughrue Mion, PLLC

(57) ABSTRACT

An image format converting method and apparatus are provided. The image format converter includes a pre-filter for pre-filtering the input image and for outputting a pre-filtered signal, and a format converter for bi-linear interpolating the pre-filtered signal, according to a predetermined aspect ratio, and for outputting a format converted signal. Therefore, the image format converter can have simple structure by adding the pre-filter, before the format converter using simple bi-linear interpolation, so that the image can be enlarged or reduced while remaining distinct and without aliasing.

16 Claims, 1 Drawing Sheet

IMAGE FORMAT CONVERTING METHOD AND APPARATUS

BACKGROUND OF THE INVENTION

The present invention relates to an image format converting method and apparatus, and more particularly, to a method and apparatus for enlarging and reducing an image.

In digital television systems, the size of an image to be displayed is not fixed. Specifically, in the case of high-definition television, the size of a displayed image varies greatly. However, general purpose image displays are designed to display an image with a predetermined resolution. Therefore, a need has developed for devices that convert various resolutions of input images into the resolution of the corresponding display. These devices are called "image format converter".

Also today, computer systems, as one type of image display apparatuses, further include hardware accelerators on graphics cards, for enlarging and reducing an image. Methods are also required for simply and effectively enlarging and reducing images.

As a result, various algorithms for enlarging and reducing a digital image have been suggested. These include zero-order interpolation, bi-linear interpolation, finite impulse response (FIR) filtering interpolation, etc. In addition, an algorithm for enlarging and reducing an image by controlling discrete cosine transform (DCT) coefficients in the frequency domain has been suggested.

These algorithms all have disadvantages. The DCT algorithm has a limited enlargement or reduction ratio, and is more complicated than the other algorithms. The zero-order interpolation is the simplest algorithm, however, its image quality deteriorates because the image signal is displayed only as values of the adjacent pixels. With bi-linear interpolation, an enlarged image is not distinct due to a low-pass filtering effect, and aliasing occurs when the image is reduced. Finally, the FIR filtering method provides an excellent image even when the image is enlarged or reduced, however, it requires a significant amount of calculation and restricts the transform of coefficients based on the enlargement or reduction ratio.

SUMMARY OF THE INVENTION

To solve the problems described above, an objective of the present invention is to provide an image format converter for enlarging and reducing an image in real-time with a simple structure that provides excellent image quality.

Another objective of the present invention is to provide an image format converting method for enlarging and reducing an image in real-time that provides excellent image quality.

To achieve the first objective, an apparatus for converting the resolution of an input image to enlarge and reduce the input image, has been designed that comprises a pre-filter and a format converter. The pre-filter outputs a pre-filtered image signal. The format converter performs a bi-linear interpolation on the pre-filtered image signal, according to a predetermined aspect ratio, and outputs a format-converted signal.

To achieve the second objective, a method for converting the resolution of an input image to enlarge and reduce the input image has been formulated that comprises the steps of: (a) pre-filtering the input image to output a pre-filtered signal; and (b) performing bi-linear interpolation on the pre-filtered signal, according to a predetermined aspect ratio, to output a format-converted signal.

DETAILED DESCRIPTION OF THE PREFERRED EMBODIMENT

Figure 1:
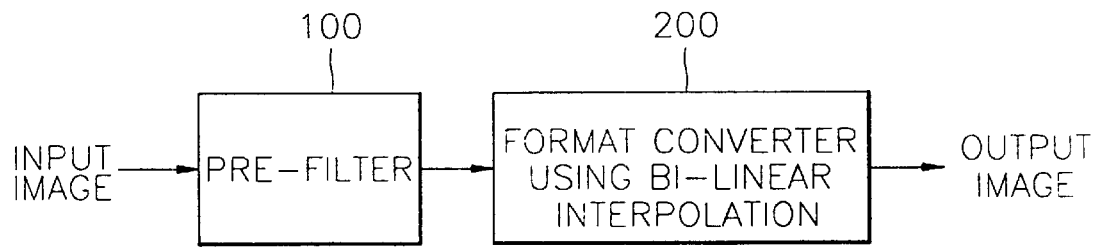
FIG. 1 is a block diagram of an image format converter according to a preferred embodiment of the present invention.

In FIG. 1, an image format converter according to a preferred embodiment of the present invention includes a pre-filter 100, and a format converter 200 using a bi-linear interpolation algorithm.

The pre-filter 100 varies a parameter A (to be described later) according to an enlargement or reduction ratio of an input image. The format converter 200, enlarges or reduces an image by performing bi-linear interpolation on the signal filtered by the pre-filter 100, according to a predetermined aspect ratio.

Figure 2A:
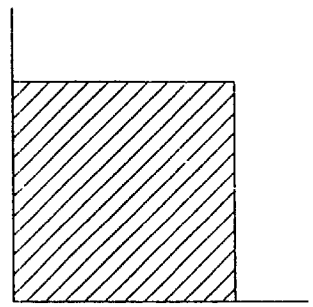
FIGS. 2A and 2B are diagrams showing the frequency spectrums of input and output signals, respectively, of the image format converter shown in FIG. 1.
Figure 2B:
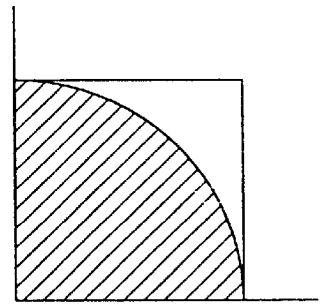

The format converter 200 changes the frequency spectrum of the image signal passing through the format converter 200 by attenuating the high-frequency component of the image signal. FIG. 2A shows the frequency spectrum of the image signal input to format converter 200. FIG. 2B shows the frequency spectrum of the image signal after format convertor 200 performs bi-linear interpolation.

Thus, the image format converter according to the present invention adopts a format converter using a bi-linear interpolation algorithm, which can be easily implemented due to its simple structure, thereby maximizing the benefits of bi-linear interpolation, without deteriorating image quality.

When enlarging an image using format converter 200, the image displayed on a screen is indistinct due to the low-pass filtering effect. To compensate for this problem, the input image signal is high-pass filtered by pre-filter 100, and the resulting signal is output to format converter 200, thereby compensating for the attenuation of the image signal during bi-linear interpolation. The image can be made further distinct by controlling the frequency characteristic of the high-pass filter of pre-filter 100. Also, when reducing the image, the pre-filter 100 acts as a low-pass filter to reduce aliasing.

Figure 3:
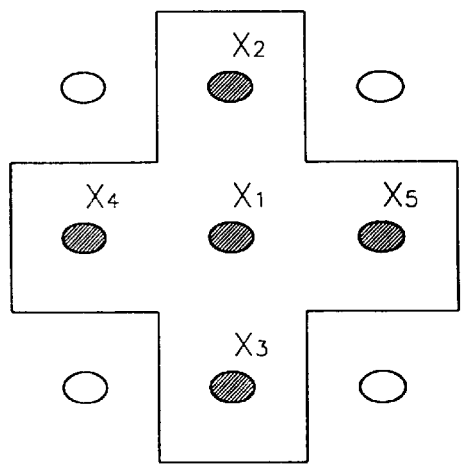
FIG. 3 is a diagram showing an example of a window used in the pre-filter shown in FIG. 1.

An example of a window used in pre-filter 100 is shown in FIG. 3. Pre-filter 100 uses five points on an image plane, i.e., input image sample $X_1$, and above, below, left and right samples $X_2$, $X_3$, $X_4$ and $X_5$ adjacent to the input sample $X_1$. An output $F_1$ of the pre-filter 100 is expressed by the following formula:

$$F_1 = X_1 + A \cdot \left(X_1 - \frac{X_2 + X_3 + X_4 + X_5}{4}\right)$$

where A is greater than −1.

In the formula above, A is a parameter controlling the frequency characteristic of pre-filter 100, wherein the pre-filter acts as a high-pass filter if A is set to a positive value, and a low-pass filter if A is set to a negative value. A may also be set to have a larger absolute value proportionate to the enlargement or reduction ratio.

According to the pre-filter of FIG. 3, aliasing may occur when the image is reduced by half or less. However, this aliasing can be counteracted by using a pre-filter with more points on the image plane.

As described above, the image format converter of the present invention can have simple structure by adding a pre-filter, before a format converter using simple bi-linear interpolation, so that the image can be enlarged and reduced while remaining distinct and without aliasing.

What is claimed is:

1. An image format converter for converting a resolution of an input image to enlarge or reduce the input image, the image format converter comprising:

a variable effect pre-filter for pre-filtering the input image and for outputting a pre-filtered signal, said filter having selectable characteristics, said characteristics being defined by a parameter having one of a positive or negative sign that determines whether the filter is a high pass or low pass filter, and an absolute value that determines a degree of enlargement and reduction; and a format converter for bi-linear-interpolating the pre-filtered signal, according to a predetermined aspect ratio, and for outputting a format-converted signal;

wherein filter characteristics of the pre-filter are selectable to compensate for operational effects of the format converter, wherein the operational effects comprise at least one of attenuation and aliasing caused by enlarging or reducing the input image.

2. The image format converter of claim 1, wherein the pre-filter is a high-pass filter.

3. The image format converter of claim 1, wherein the pre-filter is a low-pass filter.

4. The image format converter of claim 1, wherein an output of the pre-filter is expressed by the following formula:

$$F_1 = X_1 + A \cdot \left( X_1 - \frac{X_2 + X_3 + X_4 + X_5}{4} \right)$$

where an image sample input of the pre-filter is $X_1$, and image samples adjacent to the image sample $X_1$ are $X_2$, $X_3$, $X_4$ and $X_5$, respectively, and parameter A is greater than −1.

5. The image format converter of claim 4, wherein for enlarging the input image, the parameter A has a positive value and the pre-filter acts as a high-pass filter.

6. The image format converter of claim 4, wherein for reducing the input image, the parameter A has a negative value and the pre-filter acts as a low-pass filter.

7. The image format converter of claim 1 wherein said variable effect prefilter and said format converter are connected in sequence along a single common path.

8. The image format converter of claim 7, wherein the signal input to the prefilter is either high pass filtered or low pass filtered, depending on the selected filter characteristics.

9. An image format converting method for converting a resolution of an input image to enlarge and reduce the input image, the image format converting method comprising the steps of:

(a) selectably setting filter characteristics of a pre-filter to compensate for operational effects of a format converter, wherein the operational effects comprise at least one of attenuation and aliasing caused by enlarging or reducing the input image, said selectably set characteristics being defined by a parameter having a positive or negative sign that determines whether the filter is a high pass or low pass filter and an absolute value that determines the degree of enlargement and reduction;

(b) pre-filtering the input image based upon the selected filter characteristics to output a pre-filtered signal; and (c) bi-linear-interpolating the pre-filtered signal, according to a predetermined aspect ratio, to output a format-converted signal.

10. The image format converting method of claim 9, wherein the pre-filtering of step is high-pass filtering.

11. The image format converting method of claim 9, wherein the pre-filtering of step is low-pass filtering.

12. The image format converting method of claim 9, wherein the pre-filtered signal in step is expressed by the following formula:

$$F_1 = X_1 + A \cdot \left( X_1 - \frac{X_2 + X_3 + X_4 + X_5}{4} \right)$$

where an image sample input to the pre-filter is $X_1$, and image samples adjacent to the image sample $X_1$ are $X_2$, $X_3$, $X_4$ and $X_5$, respectively, and parameter A is greater than −1.

13. The image format converting method of claim 12, wherein for enlarging the input image, the parameter A has a positive value.

14. The image format converting method of claim 12, wherein for reducing the input image, the parameter A has a negative value.

15. The image format converting method of claim 9, wherein input image signal is subject to first a prefiltering step and then a bilinear interpolating step by processing said signal along a single common path.

16. The image format converting method of claim 15 wherein the input image signal is either high pass filtered or low pass filtered, depending on the step of selectably setting filter characteristics.

* * * * *